United States Patent Office 2,723,421
Patented Nov. 15, 1955

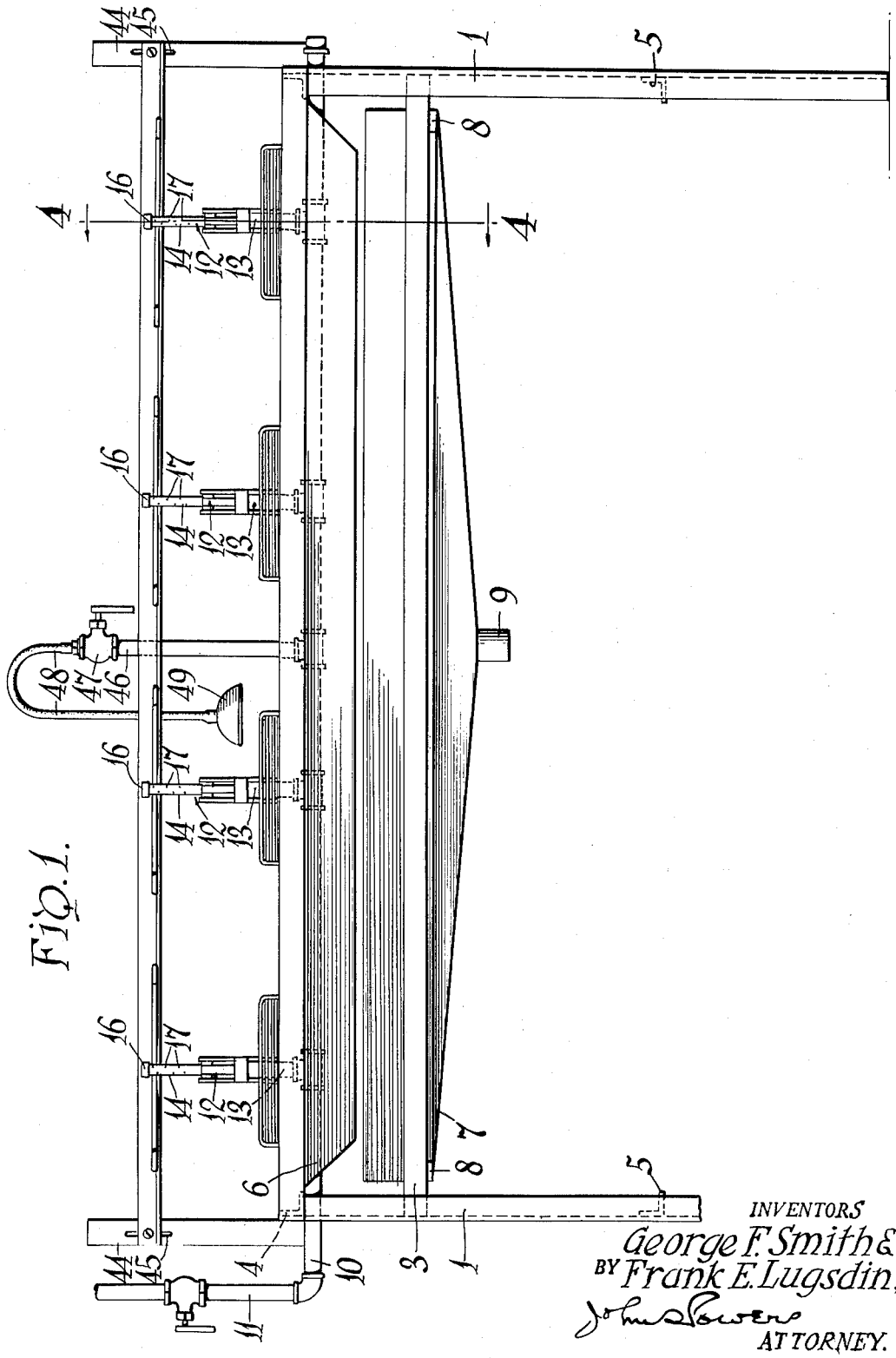

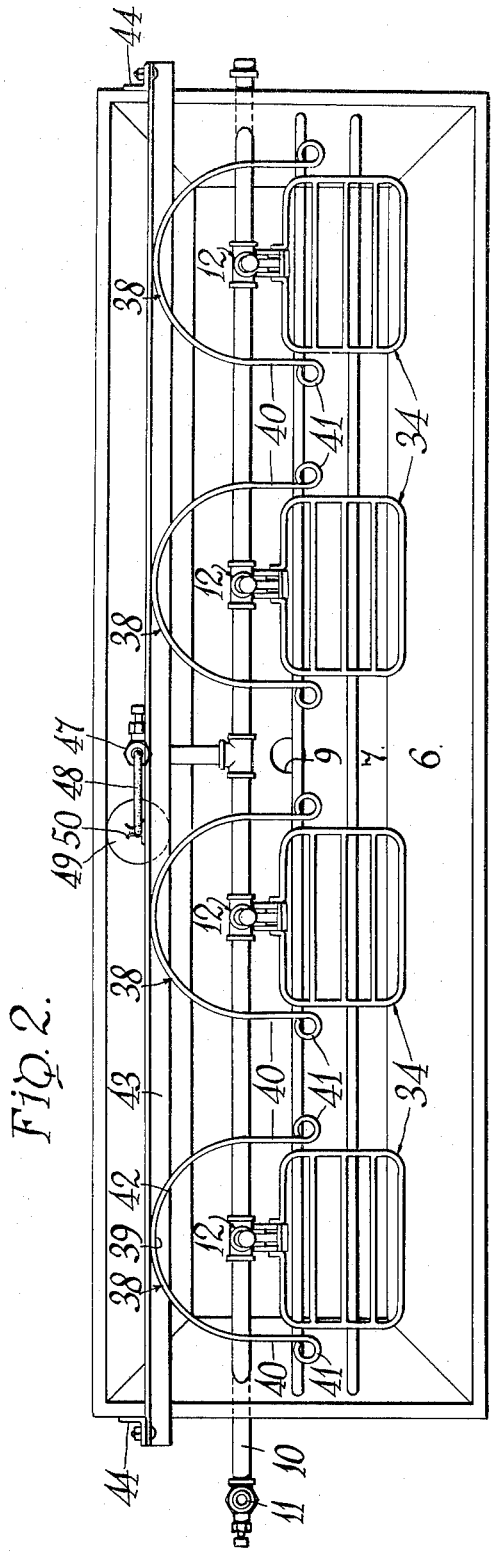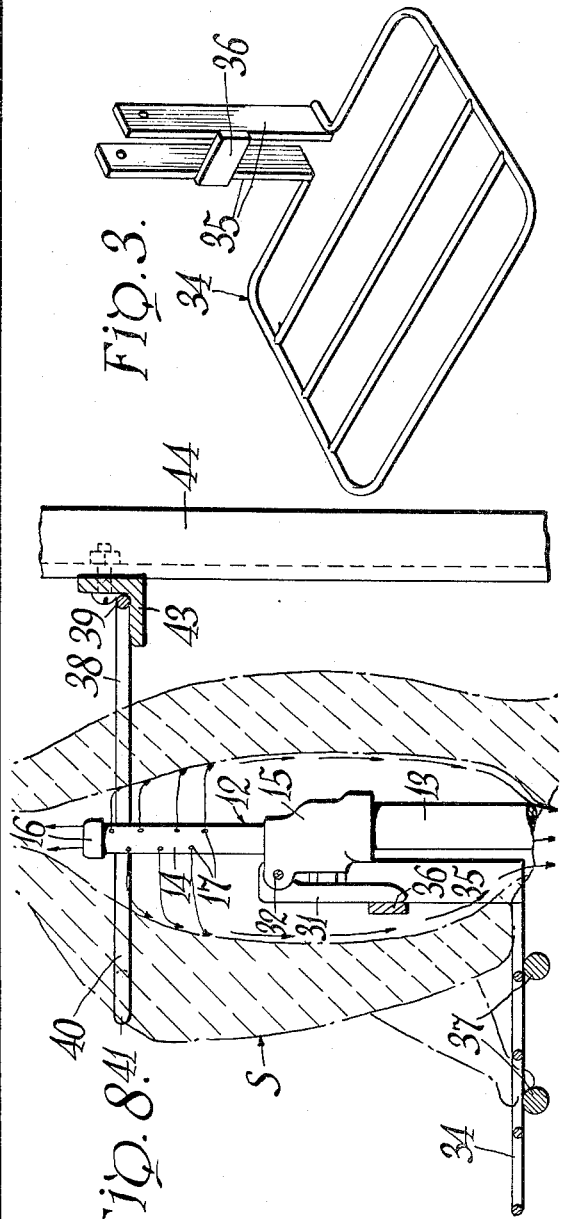

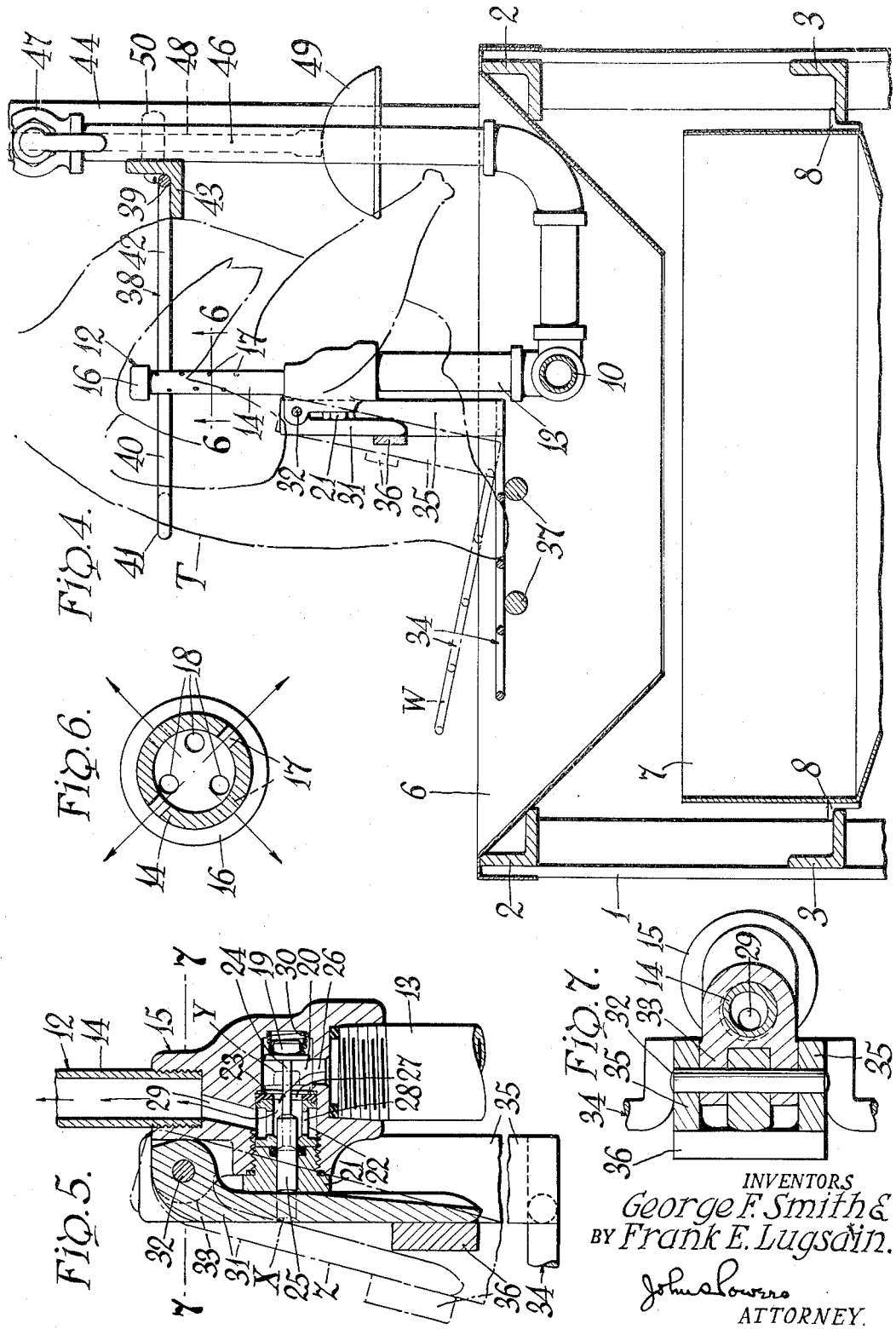

2,723,421

APPARATUS FOR THE INTERNAL CLEANING OF DRESSED TURKEYS OR OTHER POULTRY

George F. Smith, Williamsville, and Frank E. Lugsdin, East Amherst, N. Y.

Application March 9, 1953, Serial No. 341,098

5 Claims. (Cl. 17—11)

This invention relates to apparatus for the internal cleaning of dressed turkeys or other poultry.

In the operation of turkey farms the turkeys are eviscerated on a dressing table and in preparation for the market are thereafter cleaned internally. The usual practice is to provide a trough several feet in length which is filled with water to a depth suitable for the turkey to be substantially completely submerged. A workman submerges the turkey in the water and manually gives it various agitating movements in the course of which the water flows into the turkey through the slit provided in the eviscerating operation, the contact of the water with the flesh of the turkey in connection with the agitation produced by the movements of the turkey being relied upon to effect the internal cleaning. This practice has a number of drawbacks, viz.: it is wasteful of time and labor; the water rapidly becomes fouled and, regardless of the time of submergence and agitation, the cleaning operation is very short of being thorough or complete; time is lost by the necessity for frequent drainage of the fouled water and its replenishment by clear water; due to the same necessity there is a substantial waste of water, this being a very serious drawback in many rural areas in which the water is not piped or is in a supply so limited as to require careful husbanding; and there is a sacrifice of the advantage of suitably precooling the turkeys substantially to reduce body heat before placing them in the chilling bath in preparation for their delivery to the purchaser.

Another practice is to hold the turkey manually in relation to a water discharge nozzle inserted through the slit. This practice is wasteful of labor and is not conducive to the economical operation of the turkey farm because of the limitation which it imposes upon the number of turkeys that can be dressed per day in the absence of the employment at greatly increased expense of a special crew for cleaning the turkeys after evisceration.

The invention serves the following important objects: the thorough internal cleaning of each turkey with clear water; the thorough internal cleaning of each turkey in a minimum period of time as compared with the time required by the practices heretofore followed; ease and quickness in positioning the turkey for internal cleaning and removing it from the apparatus when the cleaning has been accomplished; the availability of the apparatus for simultaneously cleaning a substantial number of turkeys, e. g. ten or a dozen, without the necessity of a special attendant; marked economy in respect to the consumption of water; cleaning operations which effect an advantageous precooling, i. e. reduction of the body temperature, of the turkeys; the holding of the turkey in the most advantageous position for thorough cleaning and draining; the holding of each turkey in such a manner that its position may be quickly and easily altered in order to insure the thoroughness of the cleaning operation; the capacity for cleaning turkeys of the various sizes within the commercial range of the order of from six pounds to upwards of twenty pounds; and the capacity for a maximum output of thoroughly cleaned turkeys in a working day.

With the above objects in view the apparatus is characterized generally by a shelf-like turkey supporting platform, preferably in the nature of a grid and which has a substantially horizontal operative position, an upright water spray pipe located behind the platform and projecting above it, the upper portion of the pipe being formed with spray openings or otherwise provided with a suitable discharge nozzle feature, a valve organization for controlling the flow of water through the spray pipe and including a normally closed spring loaded valve element, a bracket from which the platform is suspended for movement between active and inactive positions, the platform being spring biased to its normal inactive position and the casing of the valve organization preferably being utilized to provide the bracket, a lever which effects and maintains the opening of the valve element and is moved for such purpose by the platform as moved to its active position under the weight of the turkey to be cleaned, and a stabilizing frame which holds the turkey against lateral, forward or rearward tilting and thereby insures that the turkey will be maintained in positions most favorable to thorough internal cleaning and that the water discharge portion of the upright pipe will be spaced from the surrounding flesh. The turkey is supported in substantially vertical positions in which it may be freely and thoroughly drained through the slit which extends from its rump and is provided in the eviscerating operation; and the upright water spray pipe projects into the turkey through the slit and serves as a vertical axis about which the turkey may be turned from one position to another to insure the thoroughness of the internal cleaning.

The combination of characterizing features as enumerated in the preceding paragraph may be provided in any desired number according to the production capacity of the particular farm. For comparatively small farms two turkey supporting platforms may suffice. As herein shown four are provided. Any desired number may be provided within practical limits, say up to ten or twelve, in accordance with the production capacity of the farm. In use the apparatus is arranged adjacent the eviscerating table or tables at which a number of workmen effect the eviscerating operations. This is done quite quickly by modern equipment and when each workman eviscerates a turkey he will place it in position upon a supporting platform of the cleaning apparatus and return to his work at the eviscerating table, leaving it later for a momentary period in which he changes the position of the turkey. A turkey previously cleaned and resting upon a supporting platform may be removed in a second or less to make room for the positioning in a second or less of the turkey next to be cleaned.

In the operation of the majority of turkey farms it will be unnecessary to have an attendant stationed for exclusive work at the cleaning apparatus since, as just pointed out, this work may readily be done by those who work at the eviscerating table or tables. In infrequent cases where the production capacity of the turkey farm may be exceptionally large and where the cleaning apparatus (in one or more units) may include an exceptionally large number of turkey supporting platforms it may be found more economical in the long run to have it in the exclusive charge of a single workman who will handle the turkeys as they are delivered to him from the eviscerating tables.

The time required for the thorough internal cleaning of a turkey is of the order of two minutes. Assuming that the cleaning apparatus has four turkey supporting platforms, as shown, and that there are four workmen at the dressing table the apparatus is capable in a working day ranging from 8:00 a. m. to 6:00 p. m. of cleaning at least five hundred turkeys. Since a workman's attendance at the cleaning apparatus is not required during the cleaning operation the workmen are permitted to spend substantially more time at the dressing table and a much greater number of turkeys may be dressed in the course of the day than would be the case if each workman were required to attend the cleaning apparatus during the period of time necessary for the cleaning of the turkey which he has dressed. As compared with the practice of manually submerging the turkey in the water bath and giving it various agitating movements, a practice which in any event does not effect thorough cleaning, experience has shown that the apparatus effects an increase in the number of turkeys cleaned per working day of the order of at least one hundred and fifty. In other words assuming two turkey farms maintaining a like number of turkeys such that the cleaning apparatus of the present invention will require four turkey supporting platforms and that one farm uses the improved cleaning apparatus while the other farm uses the old method of submerging the turkey in a water bath the increase in production achieved by the cleaning apparatus of the invention in a working day will be at least one hundred and fifty turkeys.

In the drawings:

Figure 1 is a front elevation of apparatus in accordance with the invention.

Figure 2 is a plan view thereof.

Figure 3 is a perspective view of a turkey supporting platform, the several platforms being of similar construction.

Figure 4 is a vertical cross sectional view of the apparatus on the line 4—4 of Figure 1, the scale being somewhat enlarged.

Figure 5 is a detail vertical sectional view of the valve organization in relation to the mounting features of the turkey supporting platform.

Figure 6 is an enlarged horizontal sectional view of one of the upright spray pipes on the line 6—6 of Figure 4 looking in the direction of the arrows, the other spray pipes being similar in construction.

Figure 7 is an enlarged detail horizontal sectional view on the line 7—7 of Figure 5.

Figure 8 is an enlarged detail vertical cross sectional view on the line 4—4 of Figure 1 in which the turkey is shown as having been turned about a vertical axis through an angle of 180° from the position in which it is shown in Figure 4.

The various operating parts are supported by a main frame which is conveniently of angle iron construction and includes vertical supporting legs 1, longitudinal upper and lower horizontal bars 2 and 3 extending between and connected to the legs of the front and rear pairs and transverse upper and lower horizontal bars 4 and 5 extending between and connected to the front and rear legs at each side of the frame. The upper bars 2 and 4 are utilized for the support of a water discharge apron 6 which is open at its top and bottom and has its side and end walls in downwardly converging relation, the apron 6 serving to catch any water sprays and to direct the water and any solid matter suspended in the water into a catch basin 7. The basin 7 is arranged immediately below the apron 6 and is supported by means of brackets 8 from the lower longitudinal bars 3. The bottom wall of the basin 7 is of tapering outline and carries a central water discharge tube 9 through which the water flows to the floor or ground. The basin 7 is freely removable for cleaning purposes and may be withdrawn from the frame by a sliding movement in either direction in which it is pulled between the legs at either end of the frame.

The water for cleaning the turkeys is supplied by a horizontal pipe 10 which is preferably located within the apron 6, extends from end to end of the main frame, and at one end is connected by a pipe 11 to a source of supply. The pipe 10 delivers water to upright spray pipes designated generally as 12. Each spray pipe 12 consists of a vertical branch section 13 connected to the pipe 10, a vertical spray head section 14 located above the section 13 and an intermediate section 15 which connects the sections 13 and 14 and is constituted by the casing of a valve organization. As shown each spray head section 14 carries a cap 16 at its upper end. The spray head of each section 14 is provided by spray openings 17 in the section and 18 (Figure 6) in the cap 16. The openings 17 are provided in such number and arrangement that they deliver at different levels a multiplicity of radiating horizontal cleaning jets, similar jets vertically directed being discharged through the openings 18 of the cap 16. Instead of the openings 17 and 18 each spray head section may, of course, be provided with a spray nozzle of any suitable and well known construction.

Communication between the sections 13 and 14 is normally cut off by a self closing valve 19, the casing of which is provided by the section 15. The casing 15, valve 19 and associated parts are elements of a valve organization which may be of any suitable and known construction sold by industrial supply houses, one such construction being shown in detail in Figure 5. The valve casing 15 includes a horizontal chamber 20 in which the valve 19 is movable. One end wall of the chamber 20 is provided by the metal of the valve casing 15 and the opposite wall is provided by a nut 21 which is engaged in a threaded opening in the front wall of the casing 15. A cage 22 is fitted in fixed position in the chamber 20 and provides a seat 23 for the valve 19, this seat preferably including a cushioning washer. The valve 19 is in the form of a disc which is carried by a centrally located horizontal stem 24. The stem 24 extends axially of the chamber through the cage 22 and includes a terminal guide portion 25 which is movable in a central guide opening in the nut 21 and normally projects beyond the outer face of the nut as shown in broken lines X in Figure 5. The casing 15 is formed at its lower side with a threaded opening into which is tapped the upper end portion of the section 13. The lower wall portion of the chamber 20 is formed with a port 26 which establishes communication between the chamber and the section 13. The inner vertical wall of the cage 22 is formed with an opening 27 which is enlarged relatively to the stem 24 and establishes communication between the chamber 20 and the interior of the cage. The peripheral wall of the cage 22 is formed with a number of discharge openings 28. The upper wall of the casing 15 is formed with a threaded opening into which is tapped the lower end portion of the section 14. The upper wall of the chamber 20 is formed with a port 29 which establishes communication between the cage 22 and the section 14. The valve 19 is normally held upon its seat 23 as shown in broken lines Y by a spring 30 arranged between the valve and the closed end wall of the chamber 20 and reacting upon these parts.

The valve 19 is moved to its fully opened position and held in such position by a lever 31 which is pendant from a transverse pivot pin 32 fitted in a pair of ears 33 at the upper end and front side of the valve casing 15. The inner face of the lever 31 engages the outer end of the valve stem portion 25. When the valve is held closed by the spring 30 the valve stem portion 25, projecting forwardly beyond the valve casing as shown at X, holds the lever 31 in the normal position Z shown in broken lines in Figure 5.

The turkey to be cleaned is supported in a vertical position upon a shelf-like platform 34 which projects in a forward direction from the pipe section 13 and is preferably in the form of a grid. The platform 34 is so mounted as to have two positions in one of which, its normal raised position in which it is shown in broken lines W in Figure 4, it projects along an upward incline and in the other of which, its active lowered position in which it is shown in full lines in Figure 4, it occupies a horizontal plane. For the purpose of its mounting the platform 34 is provided along its rear side with a pair of centrally located arms 35 which are suitably spaced in parallel relation and extend upward. The upper end portions of the arm 35 are located adjacent the ears 33. The pivot pin 32 is utilized as a pivotal mounting for the arms 35 and has end extensions which are fitted in openings in the arms. The arms 35 carry a cross piece 36 which is located to bear upon the front face of the lever 31 near its lower free end. With the valve 19 in its normally closed position and the lever 31 held in the position Z, the lever by its engagement with the cross piece 36 will hold the platform 34 in its normal inactive position as shown by the broken lines W. Under the weight of the turkey the platform will be moved to its lower position in which the cross piece 36 moves the lever 31 to a position in which its inner face adjoins the outer face of the nut 21, the lever in turn moving the valve 19 to its fully opened position and holding it in such position.

The discharge apron 6 preferably carries two or more spaced horizontal bars 37 which extend between the ends of the apron and in the longitudinal direction thereof. The elevation of the bars 37 is selected to correspond to the lower position of the platform 34. When the platform is in its lowered position it engages or rests upon the bars 37 which thereby serve to prevent the springing of the platform or the springing of the lever 31 under the weight of the turkey.

A turkey to be cleaned is placed upon the platform 34 in a vertical position as shown by the broken lines T in Figure 4. In so positioning the turkey the upright spray pipe 12 projects into it through the slit formed by the evisceration equipment. The turkey is preferably so held, as best shown in Figure 8, that its flesh will be out of contact with the spray pipe 12. For this purpose a turkey stabilizing frame 38 is associated with each spray pipe 12 and corresponding turkey supporting platform 34. The frame 38 is preferably made of bar stock of round cross section and is of general U-shape, occupying a horizontal plane at an elevation near the upper end of the spray pipe. Each frame 38 includes a bow portion 39 which serves for its attachment at a central point and a pair of substantially parallel forwardly projecting arms 40 which preferably terminate in rounded sections 41. Each frame 38 is located symmetrically with relation to the corresponding spray pipe 12 and platform 34. As of U-shape each frame 38 has an open front side, a closed rear side and, by reason of its bow, rearwardly converging lateral portions 42. The office of the frame 38 is to hold the turkey in the most favorable position for cleaning and draining, that is to say in cooperation with the platform 34 to hold the turkey in a general vertical position in which its flesh is generally free from contact with the pipe 12 and to prevent substantial tilting of the turkey laterally or in the fore and aft direction. The dimensions of the frame 38 are selected to enable it to serve this purpose both with turkeys of larger and smaller sizes. For turkeys of larger sizes, for example of upwards of fifteen pounds, the arms 40 may extend under the wings. For turkeys of smaller sizes, for example of below fifteen pounds, the arms 40 may extend along the outer sides of the wings. In the position T the rump will rest upon the platform 34 and the breast or keel portion will rest against the converging lateral portions 42 of the frame 38. The rounded terminals 41 of the arms 40 eliminate the possibility of the ends of the arms cutting into the skin of the turkey when it is placed in position for cleaning.

The frames 38 are supported by a horizontal bar 43 which extends from end to end of the apparatus and is carried by upright posts 44 secured at their lower ends by fastening bolts to the frame bars 4. The bar 43 is preferably of angle iron cross section and the bow portion 39 of each frame 38 is rigidly connected to the bar.

The frames 38 are preferably adjustable to different elevations according to the length of the fowls to be processed. While the frames 38 could obviously be connected to the bar 43 for individual vertical positional adjustment it is preferred that such adjustment be made with respect to all of the frames simultaneously by raising or lowering the bar 43. For this purpose a central segment of each frame 38 is preferably welded to the flanges of the bar 43 and the posts 44 are each formed with a vertical slot 45, the connections between the bar 43 and the posts 44 consisting of bolts which pass through the slots 45.

In accordance with the usual practice the turkeys are cleaned externally at the eviscerating table. However as a precautionary measure a centrally located upright branch pipe 46 may be connected to the pipe 10, the pipe 46 having a manual valve 47 and being connected at its upper end to a section of flexible hose 48 which carries a spray head 49, the hose section 48 being normally confined in a clip 50 attached to the bar 43. If, perchance, the external cleaning at the eviscerating table should not have been well done or if the turkey should otherwise have any foreign particles adhering to its skin the spray head 49 may be used to complete the external cleaning.

In the use of the apparatus a workman carries a dressed turkey to the apparatus and positions it for cleaning, selecting an empty platform 34 if there be one or otherwise removing a turkey which has been cleaned in order to clear a platform. The turkey is held in a vertical position with its slit over the end of the section 14 and is dropped between the arms 40 into position for cleaning, the pipe 12 of course penetrating the turkey through the slit. When the turkey strikes the cleaning platform 34 its weight causes the platform to be moved from its normal position W in which the valve 19 is closed to its active position in which it rests upon the bars 37 and effects the opening of the valve 19. Horizontal and vertical jets of water are then delivered through the openings 17 and 18 against the flesh of the turkey, the jets being in such number, having such force and maintained for such a period as to effect an efficient cleaning action. During the cleaning action the water continuously drains from the turkey through the slit, carrying with it the liquid matter and solid particles which it dislodges from the flesh and falling upon the apron 6 by which it is directed into the catch basin 7. As soon as the turkey has been placed in position for cleaning and drainage the workman returns to the dressing table and eviscerates another turkey.

The turkey to be cleaned is initially put in the position T (Figure 4) in which it is held against substantial tilting by the frame 38. As a precautionary measure the turkey, before its removal from the cleaning apparatus, may be turned 180° from the position T with reference to the pipe 12 as an axis to the position S (Figure 8) in which it may be left for a few moments. As repositioned the legs of the turkey bear against a bar of the platform 34 and the turkey is, as before, held against tilting by the frame 38.

The turkey is preferably left in the cleaning apparatus for a period of approximately two minutes, this period being sufficient to insure both thorough cleaning and adequate precooling. A turkey which is removed to clear a platform 34 may, during the positioning of the next turkey for cleaning, be temporarily laid upon parts of the bars 37 which extend between adjacent platforms 34, these bars thus serving the additional function of a shelf. When the turkey to be cleaned has been positioned the turkey resting upon the bars 37 may then be placed in the chilling bath.

A platform 34, pipe 12 and frame 38 constitute a group of associated cooperating parts. A desired number of such groups may be combined in a single unit of apparatus, the form selected for illustration having four. Obviously a greater number of groups may be combined in a single unit or more than one unit, each having several groups, may be provided, all according to the production requirements of the particular farm.

It will be noted that water is discharged from the pipe 12 only during the period in which a turkey rests upon the corresponding platform 34. Immediately that the turkey, in removal, is lifted sufficiently above the platform the spring 30 operates to close the valve 19 and move the platform to its normal position W in which it is in readiness for the positioning of the next turkey to be cleaned. Generally speaking the amount and pressure of the water delivered by the section 14 or an equivalent spray nozzle enables the time period required for cleaning to be relatively short, i. e., of the order of two minutes, and the amount of water delivered in this period is not in substantial excess of that required to effect the thorough internal cleaning. Hence the apparatus is highly economical in its consumption of water.

For the reason that the cleaning of turkeys is the principal commercial field the use of the apparatus has been so described. It will be understood however that the apparatus is useful for the cleaning of all other varieties of poultry which may be raised on specialized farms and that the parts of the apparatus may be made in appropriate sizes for the particular variety to be cleaned.

It will be understood that instead of the arrangement of a cleaning unit having a number of platforms 34 adjacent the eviscerating table the apparatus may be combined with the eviscerating table, that is to say a group of associated cooperating parts, namely the platform 34, pipe 12 and frame 38, may be incorporated in the eviscerating table for each workman employed there. In this way a workman eviscerates the fowl and thereupon, without leaving his position, places it in the adjacent cleaning apparatus. Since this arrangement involves no departure from the essential elements and relationship of the apparatus as above described its illustration is deemed unnecessary.

I claim:

1. Apparatus for the internal cleaning of dressed poultry which has a slit formed in evisceration and extending from the rump, comprising, in combination: an upright spray pipe connected to a source of water supply and having an upper section constructed to provide a water spray head, a fowl supporting platform located in front of and projecting forwardly from the spray pipe at a point below the spray head, a valve fitted in the spray pipe below the spray head and above the platform, a valve casing enclosing the valve and forming a part of the spray pipe, the valve having a normally closed position in which it cuts off the flow of water to the spray head and an open position in which it permits the flow of water to the spray head, the platform being arranged below the valve casing and mounted for movement between raised and lowered positions, the platform in its lower position occupying a horizontal plane, the valve having a part which moves with it and which in the closed position of the valve projects laterally beyond the valve casing, a depending lever carried by the spray pipe, engaging said valve part and located in front thereof, the lever being movable between two positions, the lever cooperating with said valve part in its movement to one position to effect the opening of the valve and in its movement to the second position to provide for the closing of the valve, a part carried by the platform and positioned to engage the lever, the platform carried part being operative during the movement of the platform to its lower position to move the lever to that position in which it opens the valve, the lever cooperating during its movement to the second position with the platform carried part to effect the movement of the platform to its raised position, and spring means for effecting the movement of the valve to its closed position, the movement of the lever to its second position and the movement of the platform to its raised position, the platform and spray pipe being relatively arranged whereby in the cleaning operation the spray pipe projects through the slit formed in evisceration into the fowl and the fowl rests in a substantially vertical position upon the platform, its weight effecting the movement of the platform to its lower position and maintaining the platform in that position, the cleaning water and liquid and solid matter in suspension in it draining from the fowl through the slit.

2. Apparatus as set forth in claim 1 wherein the valve has a stem and is mounted in a casing which provides an intermediate section of the spray pipe, the part which moves with the valve is a terminal portion of the stem, the lever is pendant from a horizontal pivot carried by the valve casing, the platform is provided at its rear side with a centrally arranged pair of upwardly projecting arms which at their upper ends are mounted on said transverse pivot, the movement of the platform between its two positions thereby being pivotal, and the platform carried part consists of a cross piece extending between the arms and bearing upon the free end portion of the lever.

3. Apparatus as set forth in claim 1 wherein a horizontal fowl stabilizing arm is arranged adjacent the spray head at each side thereof, the arms being in spaced and symmetrical relation to the spray head, the spacing of the arms being such so as to permit a fowl to be dropped between them upon the platform and the elevation of the arms being selected whereby they will extend adjacent the wings of the fowl as positioned upon the platform.

4. Apparatus as set forth in claim 3 wherein the arms are parts of a U-shaped horizontal fowl stabilizing frame having its open end located forwardly of the spray head and having a centrally located attached bow portion located rearwardly of the spray head.

5. Apparatus as set forth in claim 1 wherein fixed horizontal bars are located below the platform at an elevation which accords with the lowered position of the platform, the platform in its lowered position bearing upon said bars.

References Cited in the file of this patent

UNITED STATES PATENTS

| | | |
|---|---|---|
| 198,160 | Seibel, Jr. | Dec. 11, 1877 |
| 541,054 | Pindstofte | June 11, 1895 |
| 665,344 | Pindstofte | Jan. 1, 1901 |
| 1,619,973 | Haberman | Mar. 8, 1927 |
| 2,427,840 | Davis | Sept. 23, 1947 |